Jan. 10, 1961

G. O. ROCKWELL 2,968,021

DEPTH CHARGE ATTACK RECORDER

Filed April 3, 1946

INVENTOR.
GAYNOR O. ROCKWELL
BY
Max A. Garner
atty.

Jan. 10, 1961  G. O. ROCKWELL  2,968,021
DEPTH CHARGE ATTACK RECORDER
Filed April 3, 1946  3 Sheets-Sheet 2

Inventor
GAYNOR O. ROCKWELL

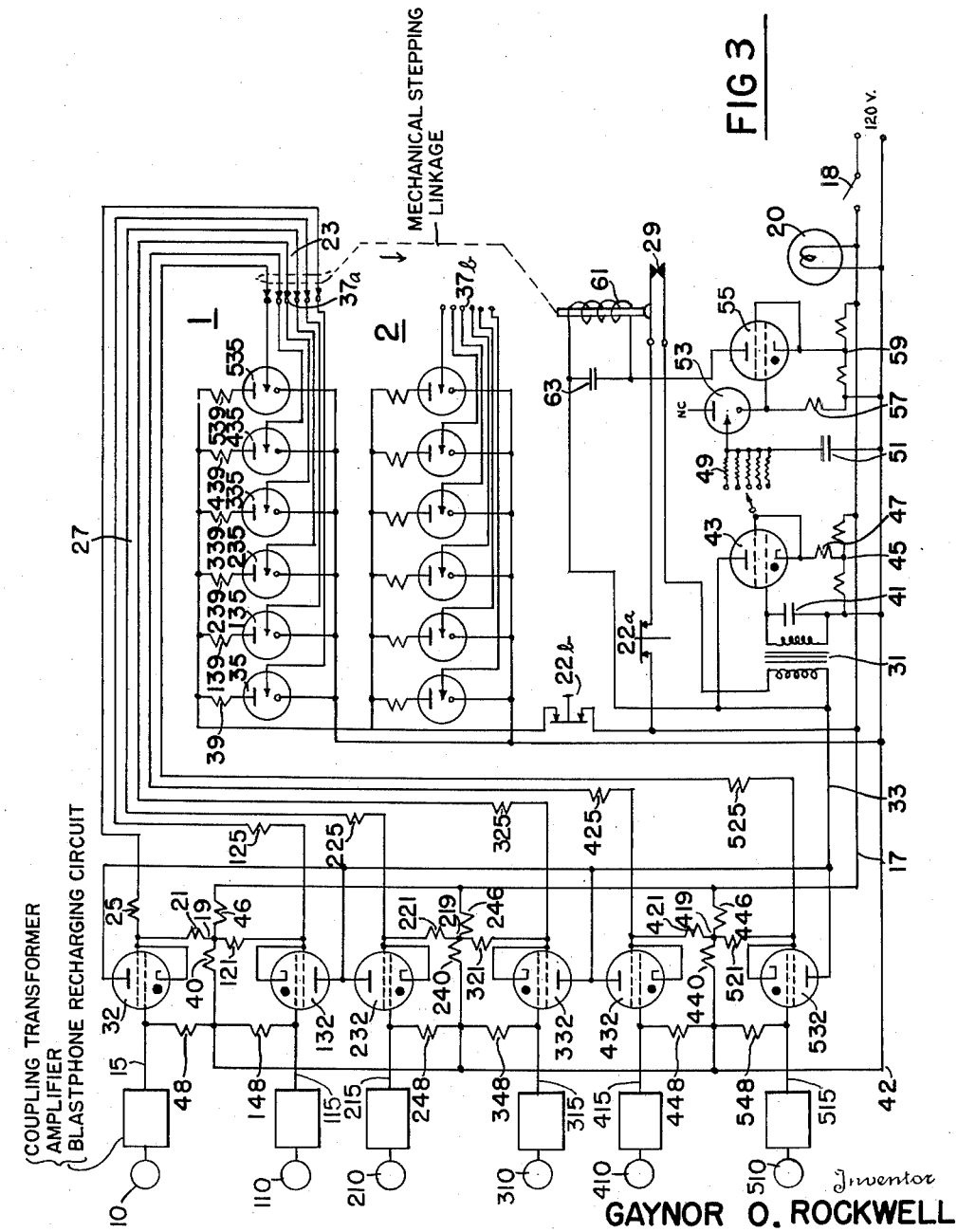

United States Patent Office 2,968,021
Patented Jan. 10, 1961

2,968,021
DEPTH CHARGE ATTACK RECORDER

Gaynor O. Rockwell, Houston, Tex., assignor to the United States of America as represented by the Secretary of the Navy Filed Apr. 3, 1946, Ser. No. 659,191

6 Claims. (Cl. 340—6)

This invention relates to a recorder as used in submarines for indicating the pattern of the externally exploded depth charges.

In submarine warfare, it is of great help to the submerged submarine under attack if the pattern of the exploding depth charges can be determined in order that the best evasive tactics can be followed.

In my co-pending application, Serial No. 561,453, which matured into Patent 2,703,873 on March 8, 1955, indicators are located for the corresponding external positions about a submarine above, below, fore and aft, port and starboard. In order to utilize the best evasive tactics, it is necessary to distinguish in horizontal directions between an explosion occurring nearly on the submarine course and one occurring in the same quadrant, but nearly abeam, particularly as an explosion within a few points dead ahead represents a greater potential peril to the submarine than those occurring more nearly to the beam.

It is an object of this invention to improve both the quality and quantity of the information recorded within the submarine. Accordingly, an improved visual attack pattern is provided by retaining on the receiving panel a plurality of explosion data rather than a record of a single explosion which requires reliance on the memory of the observer.

Other objects and many of the attendant advantages of this invention will be readily appreciated as the same becomes better understood by reference to the following detailed description when considered in connection with the accompanying drawings wherein:

Fig. 3 is a portion of the wiring diagram associated with the panel of Fig. 2.

Figure 1:
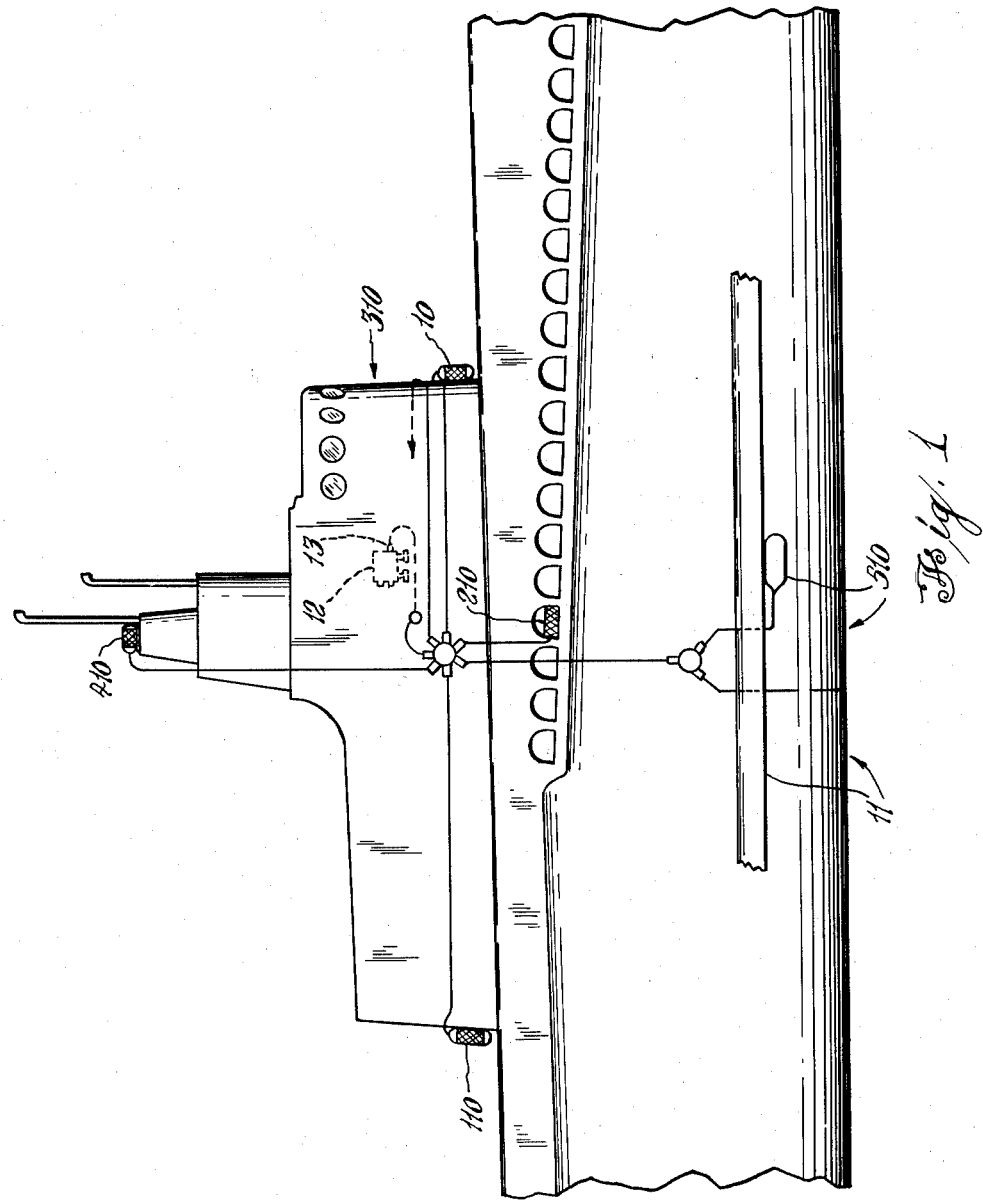
Fig. 1 is a side elevation of a portion of a submarine showing a spatial distribution of blastphones and is basically similar to Fig. 1 of U.S. Patent 2,703,873, mentioned above.

Referring to Fig. 1, blastphones, which are specially protected hydrophones, are mounted on the exterior of the submarine in opposed pairs as follows: one, 10, on the forward end of the conning tower, and one, 110, on the after end; one, 210, on the starboard side abreast of the conning tower in one of the superstructure drain holes and one, 310, on the port side; one, 410, on the periscope superstructure and two, 510, in streamlined housings under the bilge keels 11. There are two lower blastphones because it is not feasible to place a single blastphone directly under the keel and a single unit in any other location would be shaded by the keel from the wave fronts coming from the opposite side of the hull. The blastphones are connected to an equipment cabinet 12 inside the ship by suitable cables, their associated junction boxes and a multiconductor plug and jack 13.

Figure 2:
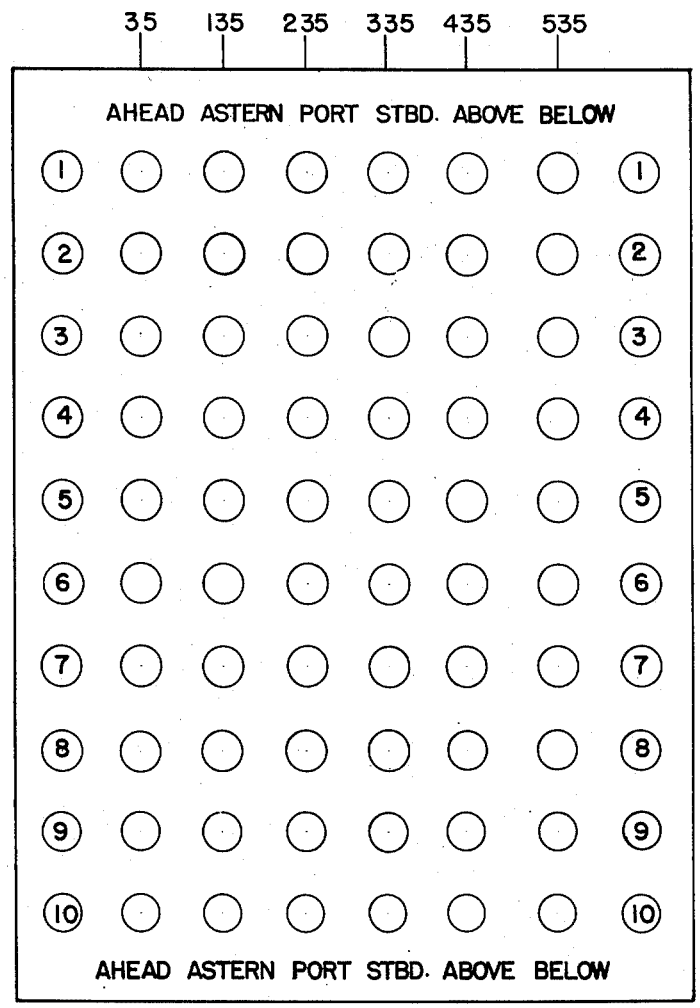
Fig. 2 is a multiple indicating panel.

Referring to Fig. 2, indicator lamps are arranged in vertical columns numbered 35, 135, 235, 335, 435 and 535 and in ten horizontal rows on an indicating panel that may be supported on equipment cabinet 12. In Fig. 3, the blastphones (10, 110, 210, 310, 410, and 510) are shown but the coupling transformers, amplifiers, and blastphone recharging circuits shown in my U.S. Patent 2,703,873 are not duplicated here. Signals from the blastphones reach the grids of respective thyratron tubes 32, 132, 232, 332, 432 and 532 through leads 15, 115, 215, 315, 415 and 515, respectively. The grids are connected to a common negative lead 42 through resistors 48, 148, 248, 348, 448 and 548 and are maintained at the highest proper negative voltage with respect to the cathode by the action of three voltage dividers made up of resistors 40, 46, 240, 246, 440 and 446, respectively, between the negative lead 42 and a positive lead 17, the cathodes being connected respectively to the common terminals 19, 219, and 419 of these pairs of resistors through resistor 21, 121, 221, 321, 421 and 521. The cathodes are also connected to rotary brushes 23 of a selector through series resistors 25, 125, 225, 325, 425 and 525, and six conductors 27. Plate voltage for the thyratrons 32, 132, 232, 332, 432 and 532 is supplied from the positive lead 17 through a manually operated input switch 22a, a normally closed contactor 29 on the selector, the primary winding of an input transformer 31 and a plate lead 33.

Control electrodes of cold-cathode triodes 35, 135, 235, 335, 435 and 535 in horizontal rows 1, 2, etc., corresponding to the horizontal rows of the panel shown in Fig. 2 are connected to contact terminal banks 37a, 37b, etc., of the selector. The cathodes of the cold-cathode triodes are connected to the negative lead 42 and the anodes are connected through individual series current-limiting resistors 39, 139, 239, 339, 439 and 539, and a manually operated interrupting switch 22b to the positive lead 17.

The selector operating circuit includes input transformer 31, the secondary winding of which, shunted by a condenser 41, is connected between the grid of a thyratron 43 and the negative lead 42. A voltage divider 45 provides the proper negative grid bias by connection of its midpoint to the cathode through a resistor 47. A timing circuit between the cathode and negative lead consists of a variable resistor 49 connected to the cathode and in series with a condenser 51. The common connection of the resistor 49 and the condenser 51 is also connected to an electrode of a cold-cathode tube 53, the other electrode of which is connected to the grid of a thyratron 55 and through a resistor 57 to the negative lead 42. The cathode of the thyratron 55 is maintained at the proper positive voltage with respect to the grid by a voltage divider 59. The plate of this thyratron is connected to the plate lead 33 through the solenoid 61 of the selector, across which is shunted a condenser 63.

In operation, the pressure wave front moving outward from a depth charge explosion strikes one of each pair of blastphones 10 and 110, 210 and 310, 410 and 510, before it strikes the other. The electrical impulses from the first blastphone struck are conducted to the grids of their associated thyratrons in the first time-discriminator circuit. What then occurs can best be described by considering one pair of blastphones 10 and 110 controlling the "ahead" and "astern" indications through the thyratrons 32 and 132.

Assume that the pressure wave front first strikes the "ahead" blastphone 10. A signal from this blastphone is impressed on the grid of thyratron 32 through the connection 15 and changes the voltage on the grid to overcome the negative grid-bias voltage of about 7.5 volts with respect to the cathode produced across the voltage divider resistor 40. Neutralization of the grid-bias voltage permits the thyratron 32 to become conductive. While the thyratron was inactive, the voltage between its plate and cathode was the difference between the line voltage, nominally 120 volts, and the grid-bias voltage, about 7.5 volts, or about 112.5 volts. When the thyratron becomes conductive the voltage drop between plate and cathode decreases to about 14 volts. Since the plate remains at line voltage, the potential of the cathode is raised to about 106 volts. By reason of the action of the resistor 21 between the cathode and mid-terminal 19 of the voltage divider, the voltage of the terminal 19, and hence of the cathode of the thyratron 132 connected with it through the resistor 121 is raised from 7.5 volts to about 45 volts above that of the negative lead 42 and the grid of this thyratron. This voltage difference between grid and cathode, instantaneously produced, provides a negative grid bias far too great to be overcome by any signal impulse received from the "astern" blastphone 110 and thus prevents the thyratron 132 from being made conductive. Similarly, the first of each of the other pairs of thyratrons 232 and 332, and 432 and 532, to become conductice, "locks out" the other with the result that only three of the six cathode-output leads are energized as the result of any one explosion.

The increased voltage on the cathodes of three of the thyratrons is applied in each case through the proper resistors 25, 125, 225, 325, 425 or 525, their associated conductors 27, rotary brushes 23 and contact terminals 37 to the control electrodes of the corresponding three cold-cathode triodes 35, 135, 235, 335, 435 or 535, causing current flow to start between their cathodes and plates. This current flow produces a glow which serves as the directional indication. Control electrode current is limited by the resistors 25, 125, 225, 325, 425 and 525 while the resistors 39, 139, 239, 339 439 and 539 limit anode current.

As each of the three active thyratrons of the six in the first time-discriminator circuit becomes conductive a surge of current flows through the plate lead 33 and the primary winding of the input transformer 31. Each of these surges induces a corresponding surge in the secondary winding which is impressed on the condenser 41. Since the time interval between successive surges is shorter than the time necessary for the condenser to discharge through the secondary winding, the result is to cause a cumulative rise in the voltage across the condenser until it overcomes the negative grid bias produced on the thyratron 43 by the action of the voltage divider 45. The thyratron becomes conductive and applies a voltage to the variable resistor 49 to charge the condenser 51. As the voltage across the condenser rises, at a rate determined by the value of the variable resistor, it reaches the voltage necessary to initiate current flow between the electrodes of the cold-cathode tube 53. This in turn raises the voltage applied to the grid of the thyratron 55, by reason of the voltage drop across the resistor 57, overcoming the grid-bias voltage produced in the voltage divider 59 and causing the thyratron to become conductive.

The plate current of the thyratron 55 flows through the solenoid 61 magnetizing it and drawing in the armature (not shown) of the selector. Movement of the armature causes the rotary brushes 23 to advance toward the next set of contact terminals 37 and also opens the contactor 29. When the contactor opens, it interrupts the plate supply to all thyratrons and restores them to a receptive condition. The condenser 63, charged by the potential across the solenoid 61 before the contactor 29 opened, discharges through the solenoid to preserve its magnetic field for sufficient time to permit the armature to complete its stroke. When current ceases flowing through the solenoid, a spring returns the armature to its initial position, completing the motion of the rotary brushes 23 to the next set of contact terminals 37 and reclosing the contactor. This leaves the entire circuit ready to indicate the next explosion.

The manually operated interrupting switch 22a is provided to open the thyratron plate circuit in the event of failure of the selector mechanism to operate. The manually operated interrupting switch 22b is provided to extinguish the cold-cathode triodes of the recording indicator bank and, by means not shown, to return the rotary brushes to their initial position.

A main switch 18 is provided in the positive lead 17, and a pilot light 20 indicates when the equipment is ready for use.

Obviously many modifications and variations of the present invention are possible in the light of the above teachings. It is therefore to be understood that within the scope of the appended claims the invention may be practiced otherwise than as specifically described.

What is claimed is:

1. A receiving system for determining the direction of a wave energy source from a location by detecting a propagated wave emanating from the source, said system comprising a plurality of detecting devices arranged in a known space pattern about the location, a trigger circuit connected to each detecting device for energization thereby in response to detection of wave energy, means interconnecting said trigger circuits in sets and responsive to energization of one trigger circuit of each of said sets of trigger circuits to render every other trigger circuit of the respective sets unresponsive to its connected detecting device, a plurality of banks of indicating circuits, the number of indicating circuits in each of said banks being equal to the number of said detecting devices, each of said banks of indicating circuits being adapted to be connected to said trigger circuits whereby actuation of a trigger circuit causes energization of the indicating circuit to which it is connected, switch means for selectively connecting said trigger circuits with each of said banks of indicating circuits, actuating means mechanically connected to said switch means for disconnecting said trigger circuits from one of said banks of indicating circuits and for connecting said trigger circuits to another of said banks of indicating circuits, whereby to indicate the direction of successive propagated waves, and means coupling said actuating means to all of said trigger circuits and rendering said actuating means operative after one trigger circuit of each set is energized.

2. The device as claimed in claim 1 further including second switch means connected to all of said trigger circuits and mechanically connected to said actuating means for deenergizing said trigger circuits coincidentally with actuation of said first-mentioned switch means.

3. A receiving system for determining the direction of each of a plurality of wave energy sources from a location by intercepting a propagated wave emanating from each wave source, said system comprising a plurality of wave detecting devices arranged in a known space pattern about the location, an output circuit connected to each of said detecting devices for energization thereby in response to detection of wave energy, said output circuits being arranged as a plurality of sets of output circuits, means interconnecting the output circuits of each set whereby when one output circuit of a set is conducting the remaining output circuits of the same set cannot conduct, a plurality of banks of indicating devices, the number of indicating devices in each bank being equal to the number of said detecting devices, first switch means adapted for connecting the indicating devices of only one of said banks at any one time to corresponding ones of said output circuits whereby the conducting output circuits activate the corresponding indicating devices connected thereto, a normally closed second switch means connected in series with said output circuits, actuating means for stepping said first switch means to another of said plurality of banks of indicating devices and for briefly opening said second switch means for resetting said output circuits, and means electrically connected to said output circuits and including means for operating said actuating means as soon as one output circuit of each set is conducting.

4. A receiving system for determining the direction of each of a plurality of wave energy sources from a location by intercepting a propagated wave emanating from each wave source, said system comprising a plurality of wave detecting devices arranged in a known space pattern about the location, an output circuit connected to each of said detecting devices for energization thereby in response to detection of wave energy, said output circuits being arranged as a plurality of sets of output circuits, means interconnecting the output circuits of each set whereby when one output circuit of a set is conducting the remaining output circuits of the same set cannot conduct, a plurality of banks of indicating devices, the number of indicating devices in each bank being equal to the number of said detecting devices, first switch means adapted for connecting the indicating devices of only one of said banks at any one time to corresponding ones of said output circuits whereby the conducting output circuits activate the corresponding indicating devices connected thereto, a transformer having a primary and a secondary, normally closed second switch means, said primary and said second switch means connected in series with each other and with each of said output circuits whereby current flow through said output circuits also flows through said primary and said second switch means, a first condenser connected across said secondary, a solenoid having a solenoid coil and a solenoid armature, said solenoid armature being mechanically connected to said first switch means and said second switch means whereby when said solenoid coil is energized said solenoid armature is activated whereby said first switch means disconnects one bank of said indicating devices from said output circuits and connects another bank of indicating devices to said output circuits and also opens said second switch means, a second condenser connected across said solenoid coil for extending the interval of effectiveness of energizing current for said solenoid coil, means connected in series with said solenoid coil for controlling current flow therethrough, triggering means connected between said first condenser and said last-mentioned means for causing said last-mentioned means to become conductive pursuant to development of a predetermined voltage across said first condenser, said means connected in circuit with said solenoid coil and said triggering means each being connected in series with said second switch means, the predetermined voltage being developed across said first condenser following conduction in all of said sets of output circuits.

5. A receiving system for determining the direction of each of a plurality of wave energy sources from a location by intercepting a propagated wave emanating from each wave source, said system comprising a plurality of wave detecting devices arranged in a known space pattern about the location, an output circuit including an electronic gaseous discharge device connected to each of said detecting devices for energization thereby in response to detection of wave energy, said output circuits being arranged as a plurality of sets of output circuits, means interconnecting the output circuits of each set whereby when one electronic gaseous discharge device of a set is conducting the remaining electronic gaseous discharge devices of the same set cannot conduct, a plurality of banks of indicating devices, the number of indicating devices in each bank being equal to the number of said detecting devices, first switch means adapted for connecting the indicating devices of only one of said banks at any one time to corresponding ones of said output circuits whereby the conducting output circuits activate the corresponding indicating devices connected thereto, a transformer having a primary and a secondary, normally closed second switch means, said primary and said second switch means connected in series with each other and with each of said electronic gaseous discharge devices whereby current through said electronic gaseous discharge devices also flows through said primary and said second switch means, a first condenser connected across said secondary, a solenoid having a solenoid coil and a solenoid armature, said solenoid armature being mechanically connected to said first switch means and said second switch means whereby when said solenoid coil is energized said solenoid armature is activated whereby said first switch means disconnects one bank of indicating devices from said output circuits and connects another bank of indicating devices to said output circuits and also opens said second switch means, a second condenser connected across said solenoid coil for extending the interval of effectiveness of energizing current for said solenoid coil, means including an electronic gaseous discharge device connected in series with said solenoid coil for controlling current flow therethrough, triggering means including an electronic gaseous discharge device connected between said first condenser and said last-mentioned means for causing said last-mentioned means to become conductive pursuant to development of a predetermined voltage across said first condenser, said solenoid coil and said triggering means each being connected in series with said second switch means, the predetermined voltage being developed across said first condenser following conduction in all of said sets of output circuits.

6. A receiving system for determining the direction of a plurality of wave energy sources from a location by intercepting a propagated wave emanating from each wave source, said system comprising a plurality of wave detecting devices arranged in a known space pattern about the location, an output circuit including a thyratron connected to each of said detecting devices for energization thereby in response to detection of wave energy, said output circuits being arranged as a plurality of sets of output circuits, means interconnecting the output circuits of each set whereby when one thyratron of a set is conducting the remaining thyratrons of the same set cannot conduct, a plurality of banks of indicating devices, the number of indicating devices in each bank being equal to the number of said detecting devices, each of said indicating devices being an electronic gaseous discharge indicating device having a pair of current conducting electrodes and an ignition electrode, the current conducting electrodes of each indicating device being adapted for connection to a power supply, first switch means adapted for connecting the ignition electrodes of only one of said banks of indicating devices at any one time to corresponding ones of said output circuits whereby the conducting output circuits activate the corresponding indicating devices connected thereto, a transformer having a primary and a secondary, said primary being connected in series with the anode of each of said thyratrons, a normally closed second switch means connected in series with said primary and adapted for connection to a power supply, a first condenser connected across said secondary, a solenoid having a solenoid coil and a solenoid armature, said solenoid armature being mechanically connected to said first switch means and said second switch means whereby when said solenoid coil is energized said solenoid armature is activated whereby said first switch means disconnects one bank of said indicating devices from said output circuits and connects another bank of indicating devices to said output circuits and also opens said second switch means, a second condenser connected across said solenoid coil for extending the interval of effectiveness of energizing current for said solenoid coil, means including a thyratron connected in series with said solenoid coil, triggering means including a thyratron connected between said first condenser and said last-mentioned means for causing said last-mentioned means to become conductive pursuant to development of a predetermined voltage across said first condenser, said solenoid coil and the anode of said last-mentioned thyratron being connected to the junction between said primary and said second switch means, said predetermined voltage being developed across said first condenser following conduction in all of said sets of output circuits.

References Cited in the file of this patent

UNITED STATES PATENTS

| | | |
|---|---|---|
| 682,584 | D'Asar | Sept. 10, 1901 |
| 2,007,211 | Nicolson | July 9, 1935 |
| 2,206,827 | Prince | July 2, 1940 |
| 2,350,888 | Hall | June 6, 1944 |
| 2,396,280 | Miller | Mar. 12, 1946 |
| 2,398,411 | Cook | Apr. 16, 1946 |
| 2,427,569 | Nicolson | Sept. 16, 1947 |